United States Patent
Hopkins et al.

(10) Patent No.: US 6,555,741 B1
(45) Date of Patent: Apr. 29, 2003

(54) METHODS TO IMPLEMENT INTERCONNECTS IN MULTI-CELL REGENERATIVE PHOTOVOLTAIC PHOTOELECTROCHEMICAL DEVICES

(75) Inventors: Jason Andrew Hopkins, Jerrabunberra (AU); George Phani, Illawong (AU); Igor Lvovich Skryabin, Yarralumla (AU)

(73) Assignee: Sustainable Technologies Australia Limited, Queanbeyan (AU)

( * ) Notice: Subject to any disclaimer, the term of this patent is extended or adjusted under 35 U.S.C. 154(b) by 0 days.

(21) Appl. No.: 09/936,693

(22) PCT Filed: Mar. 17, 2000

(86) PCT No.: PCT/AU00/00190

§ 371 (c)(1),
(2), (4) Date: Dec. 6, 2001

(87) PCT Pub. No.: WO00/57441

PCT Pub. Date: Sep. 28, 2000

(30) Foreign Application Priority Data

Mar. 18, 1999 (AU) .................................. PP9317

(51) Int. Cl.⁷ .......................... H01G 9/20; H01G 9/004;
H01G 9/26; H01M 6/36; H01L 31/05
(52) U.S. Cl. .................. 136/263; 136/252; 136/250;
136/244; 136/251; 429/111; 257/43; 257/443;
257/433
(58) Field of Search .......................... 429/111; 136/263,
136/252, 250, 244, 251; 257/43, 443, 433

(56) References Cited

U.S. PATENT DOCUMENTS

| | | | | |
|---|---|---|---|---|
| 4,927,721 A | | 5/1990 | Gratzel et al. | 429/111 |
| 5,350,644 A | | 9/1994 | Graetzel et al. | 429/111 |
| 5,415,700 A | * | 5/1995 | Arthur et al. | 136/250 |
| 5,482,570 A | * | 1/1996 | Saurer et al. | 136/255 |
| 5,525,440 A | | 6/1996 | Kay et al. | 429/111 |
| 5,672,214 A | * | 9/1997 | Arthur et al. | 136/250 |
| 5,728,487 A | | 3/1998 | Grätzel et al. | 429/111 |
| 6,069,313 A | * | 5/2000 | Kay | 136/249 |
| 6,239,355 B1 | * | 5/2001 | Salafsky | 136/250 |
| 6,469,243 B2 | * | 10/2002 | Yamanaka et al. | 136/263 |

FOREIGN PATENT DOCUMENTS

| | | |
|---|---|---|
| DE | 4306404 A1 | 9/1994 |
| DE | 4412050 A1 | 1/1995 |
| DE | 4416247 A1 | 11/1995 |
| DE | 19528401 A1 | 2/1997 |
| DE | 19540712 A1 | 5/1997 |
| WO | WO-00/59816 A1 * | 10/2000 |
| WO | WO-00/62315 A1 * | 10/2000 |

* cited by examiner

*Primary Examiner*—Alan Diamond
(74) *Attorney, Agent, or Firm*—Davis & Bujold, P.L.L.C.

(57) ABSTRACT

The present invention relates to multi-cell regenerative photovoltaic photoelectrochemical (RPEC) devices. The invention describes the structure of a multi-cell RPEC device where conductive interconnects are formed by a matrix mounting conductive particles, formed between extended portions of opposed planar conductive members.

16 Claims, 3 Drawing Sheets

METHODS TO IMPLEMENT INTERCONNECTS IN MULTI-CELL REGENERATIVE PHOTOVOLTAIC PHOTOELECTROCHEMICAL DEVICES

TECHNICAL FIELD

This invention relates to multi-cell regenerative photovoltaic photoelectrochemical (RPEC) devices, materials and methods used for internal electrically conductive connections (here called 'interconnects') for such devices, and materials and methods used for dividing electrically conducting layers within such devices.

Examples of the RPEC cells of the type concerned are disclosed in the following US patents:

4,927,721, Photoelectrochemical cell; Michael Graetzel and Paul Liska, 1990.

5,350,644, Photovoltaic cells; Michael Graetzel, Mohammad K Nazeeruddin and Brian O'Regan, 1994.

5,525,440, Method of manufacture of photo-electrochemical cell and a cell made by this muethod; Andreas Kay, Michael Graetzel and Brian O'Regan, 1996.

5,728,487, Photoelectrochemical cell and electrolyte for this cell; Michael Graetzel, Yordan Athanassov and Pierre Bonhote, 1998.

BACKGROUND TO THE INVENTION

Photoelectrochemical PV cells, as of the type disclosed in the above patents, are capable of being fabricated in a laminate arrangement between two large area substrates without undue expense. A typical arrangement utilises electrically conducting coatings upon the internal surfaces of such substrates, with at least one of such substrates being transparent to visible light (eg. comprised of glass or plastics) and coated with a transparent electron conductor (TEC). However, such TEC coatings, which usually comprise a metal oxide(s), have high resistivity when compared with normal metal conductors, resulting in high resistive losses for large area RPEC cells. In addition, individual RPEC cells generate a voltage that is inadequate for many applications. A multiple of RPEC cells (here called 'RPEC modules') connected in series would generate higher voltages and minimise total current, thereby minimising power loss due to the resistance of such TEC coating(s). External series connection of RPEC cells can increase manufacturing costs and introduce additional resistive losses. To enable internal series connection of adjacent RPEC cells, selected areas of such conducting coatings must be electrically isolated, portions of such areas overlapped when laminated, interconnects used to connect such overlapped areas and electrolyte-impermeable barriers used to separate the electrolyte of individual cells.

SUMMARY OF THE INVENTION

Preferably, the present invention provides materials and methods for interconnects for use with RPEC modules that will overcome the mentioned disadvantages in the art The present invention provides a regenerative photovoltaic photoelectrochemical device comprising two or more photoelectrochemical cells laminated between two substrates (1,12), with opposing electrical conductors (2,11) supported upon the internal surfaces of said substrates, wherein at least one conductor and it's adjacent substrate is substantially transparent to visible light, and wherein said conductors on each substrate are each divided into electrically isolated regions with each said cell being formed between parts of two regions of said opposing planar conductors and with each said cell comprising; a photoanode (3) a cathode (11) and an electrolyte medium (5), located between said photoanode and said cathode, where said adjacent photoelectrochemical cells are electrically interconnected in series by an electrically interconnecting material comprising conductive particles (6).

Note that interconnects for use with RPEC modules preferably need not have conductivities approaching that of metals, because the interconnection is made along the entire length of each cell and, moreover, the conduction path length is normally only 30 $\mu$m–50 $\mu$m, which is the distance between opposing electrically conducting coatings. Thus we have found that efficient and satisfactory RPEC modules can be made with interconnects having bulk resistivity below 20 ohm cm.

In one embodiment, this invention involves the use of an improved composite material as such interconnects which can be deposited as a thin strip of liquid or paste, so that such a strip is adapted to bridge such overlapped areas of conducting coatings and then cured (e.g. crosslinked), thermoset, dried, sintered or otherwise processed to form an electronic conductor between such conducting coatings after such opposing substrates have been assembled. Whilst said composite material can be deposited by conventional screen or stencil printing, this process may cause damage to electrodes previously deposited. In one preferred embodiment of the invention, the composite material is deposited as a thin strip of liquid or paste from a nozzle, whereby said nozzle or substrate or both are moved to effect such deposition. The composite material preferably comprises electrically conducting particles embedded in a polymeric matrix. In a preferred embodiment of the invention, the relative proportion by volume of conductive particles to matrix material in said interconnects is preferably between 1:5 and 2:1, with the high concentrations of conductive particles being preferred.

In one preferred embodiment of the invention, said interconnect may be substantially impervious to and unreactive towards the electrolyte of the RPEC cells, thereby also performing the function of an electrolyte-impermeable barrier. In another preferred embodiment of the invention, the interconnect may be unreactive towards, but not substantially impervious to, the electrolyte of the RPEC cells In this preferred embodiment of the invention, an electrolyte-impermeable barrier located beside the interconnect is used to separate the electrolyte of individual cells. In this preferred embodiment of the invention, said conductive particles and said polymer matrix of said interconnect may be selected from a wider range of materials due to less stringent chemical permeability requirements. In another preferred embodiment of the invention, the interconnect is chemically isolated from the electrolyte of the RPEC cells by electrolyte-impermeable barriers on both sides of the interconnect. In this preferred embodiment of the invention, said conductive particles and said polymer matrix of said interconnect may be selected from a wider range of materials due to less stringent chemical reactivity requirements. Said impermeable barriers may be electrically conducting or non-conducting and may be composed of any suitable material, including, but not limited to, silicones, epoxies, polyesters, polyolefins, acrylic, ormocers and thermoplastics. Said impermeable barriers may be deposited as thin strips of liquid or paste. It is preferable that said impermeable barriers are co-deposited with said interconnect from separate nozzles mounted beside the nozzle from which said interconnect is deposited. In another preferred embodiment of the invention, the interconnect comprises said composite material with a very thin strip of conductive polymer located between said composite material and one or both said conducting coatings. In this preferred embodiment of the invention, said very thin strip(s) of conductive polymer provides improved electrical conductivity between said composite material and said conducting coating(s). In this preferred embodiment of the invention, said very thin strip (s) of conductive polymer may contain polypyrroles, polyanalines, 3,4-ethylene dioxythiophenes and the like and is preferably deposited from a nozzle as previously described.

The polymeric matrix of the interconnect may be electrically conducting (e.g containing polypyrroles, polyanalines, 3,4-ethylene dioxythiophenes and the like) or may be electrically insulating (e.g. containing silicones, epoxies, polyesters, polyolefins, acrylics, ormocers, thermoplastics). Suitable materials for conducting particles may include but are not limited to metallic conductors such as metallic materials (e.g. tungsten, titanium and platinum) in the form of particles and/or metallic beads, and non-metallic conductors such as carbon, ceramics (e.g. indium tin oxide, ruthenium dioxide, cadmium stannate and fluorine-doped stannic oxide), and conducting polymers (e.g. polypyrroles, polyanalines, 3,4-ethylene dioxythiophenes and the like, which can be formed as particles from solution or formed in bulk and commuted to size).

In one preferred embodiment of the invention, the conducting particles are of dimensions approximating the distance between the opposing electrically conducting coatings. In another preferred embodiment of the invention, the conducting particles are of dimensions smaller than said distance and are preferably of dimensions less than 5% of said distance. In still another preferred embodiment of the invention, the conducting particles are of a mixture of sizes, whereby some said particles are of dimensions approximating said distance and other said particles are of dimensions smaller than said distance and are preferably of dimensions less than 5% of said distance. In still another preferred embodiment of the invention, the conducting particles are of a mixture of sizes, whereby some said particles, comprising at least 20% of the total weight of such particles, are of dimensions approximating said distance and other said particles are of dimensions smaller than said distance and are preferably of dimensions less than 5% of said distance. In still another preferred embodiment of the invention, the conducting particles are of a mixture of sizes, whereby some said particles are of dimensions approximating said distance and other said particles, comprising at least 20% of the total weight of such particles, are of dimensions smaller than said distance and are preferably of dimensions less than 5% of said distance. In still another preferred embodiment of the invention, the conducting particles are of a mixture of sizes, whereby some said particles are of dimensions approximating said distance, other said particles are of dimensions smaller than said distance and are preferably of dimensions less than 5% of said distance, and still other said particles are of dimensions less than said distance and greater than 5% of said distance. Certain mechanical forces, such as wind loading, may cause a short circuit to occur between the laminated electrodes in some RPEC module designs. It is a feature of this invention, that interconnects containing conductive particles of dimensions approximating to or near to said distance between said opposing electrically conducting coatings may prevent or minimise the occurrence of such short circuits during such mechanical loading.

BRIEF DESCRIPTION OF DRAWINGS

Having broadly portrayed the nature of the present invention, embodiments thereof will now be described by way of example and illustration only. In the following description, reference will be made to the accompanying drawings in which.

DETAILED DESCRIPTION OF THE INVENTION

Figure 1:
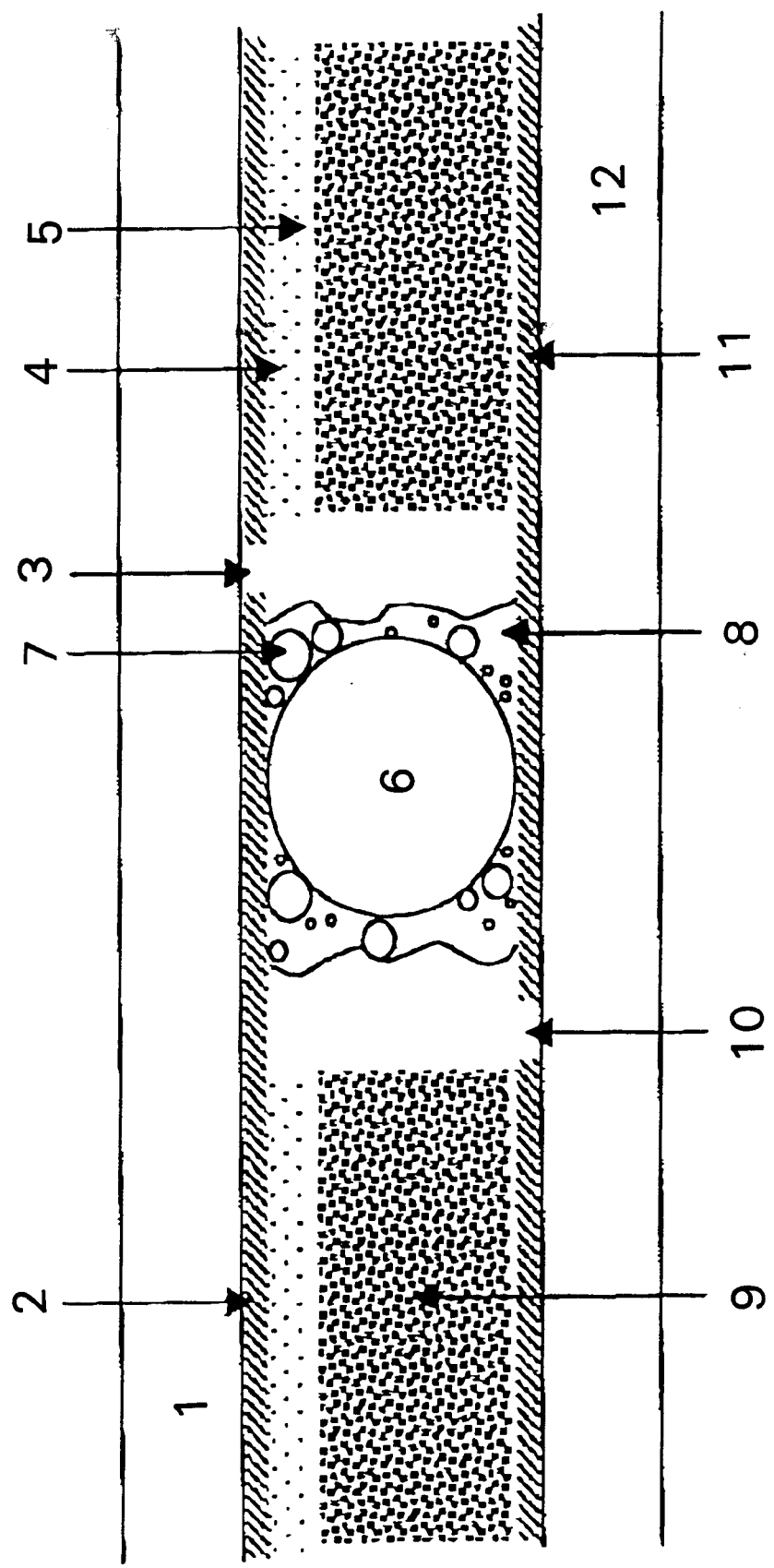
FIG. 1 is an enlarged partial transverse section of the region surrounding an interconnect within a RPEC module formed in accordance one example of the invention.

Referring to FIG. 1, this portion of the RPEC module comprises two glass substrates (1,12), both of which are coated with a transparent electron conductor (TEC) coating (2,11). The TEC layers are selectively isolated (3,10) in order to electrically separate each individual cell. The cathode comprises a platinum electrocatalyst (4) attached to one TEC coating (2), the photoanode comprises ruthenium dye-sensitised titania (9) attached to the other TEC coating (11), and an electrolyte (5) containing a redox mediator is located between the cathode and photoanode. All of the aforementioned materials are described in more detail in U.S. Pat. No. 5,350,644. The interconnect is comprised of two different electrically conducting particles, 45 Ξm titanium (6) and 0.5 Ξm tungsten (7), embedded within a polymeric silicone matrix (8), in proportions by weight of 1 to 10 to 4 respectively.

Figure 2:
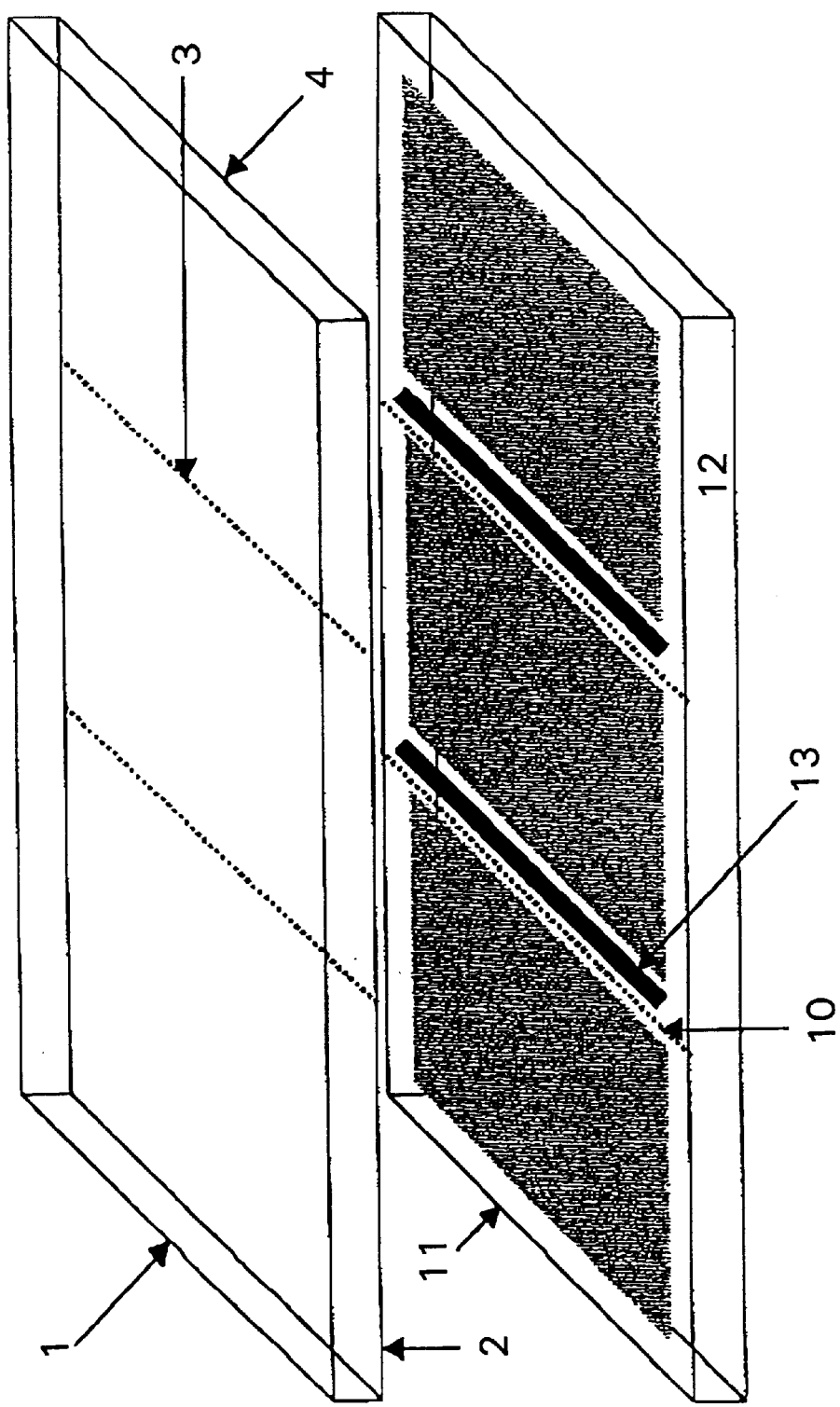
FIG. 2 is a diagrammatic perspective representation of a RPEC module formed in accordance with the above example of the invention.

Referring to FIG. 2, this diagram of a RPEC module comprises two glass substrates (1,12), both of which are coated with a transparent electron conductor (TEC) coating (2,11). The cathode comprises a platinum electrocatalyst (4) attached to one TEC coating (2). The photoanode comprises ruthenium dye-sensitised titania (9) attached to the other TEC coating (11). Also shown are the interconnect (13) and the strips where the TEC coating has been removed (3,10).

Figure 3:
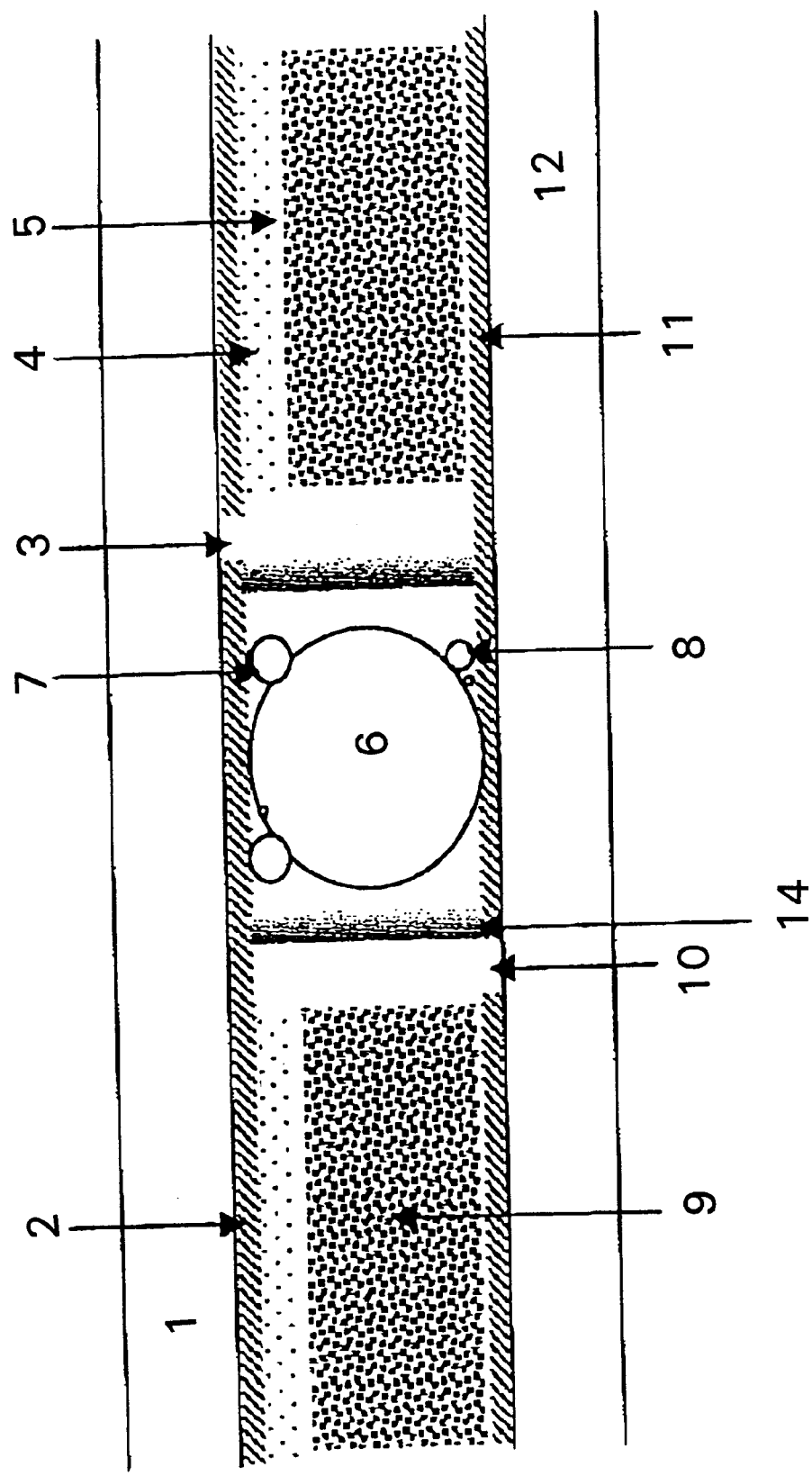
FIG. 3 is an enlarged partial transverse section of the region surrounding an interconnect within an RPEC module formed in accordance with a further example of the invention.

Referring to FIG. 3, a further example of a RPEC module formed in accordance with the present invention is illustrated. The same reference numerals have been used in FIG. 3 for the same components as designated in FIG. 1 and no further description will be given of these components. Reference numeral (14) designates protective layers forming electrolyte-impermeable barriers for separating the electrolyte (5) of individual cells.

What is claimed:

1. A regenerative photovoltaic photoelectrochemical device comprising two or more photoelectrochemical cells laminated between two substrates (1,12), with opposing electrical conductors (2,11) supported upon the internal surfaces of said substrates, wherein at least one conductor and its adjacent substrate is substantially transparent to visible light, and wherein said conductors on each substrate are each divided into electrically isolated regions, with each said cell being formed between parts of two regions of said opposing conductors and with each said cell comprising:

a photoanode (3);

a cathode (11); and an electrolyte medium (5)

located between said photoanode and said cathode, and adjacent photoelectrochemical cells are electrically interconnected in series by an electrically interconnecting material comprising conductive particles (6), where said electrically conductive particles comprise particles of dimensions approximating the distance between said opposing conductors.

2. The photoelectrochemical device in accordance with claim 1, wherein the conductive particles are placed between a separate part of the region of said conductor adjacent said photoanode of n-th said cell and a separate part of the region of said conductor adjacent to said cathode of (n+1)-th cell.

3. The photoelectrochemical device in accordance with claim 1, wherein external electrical connections are made to said device via electrical contacts (7) placed upon a separate part of the region of said conductor adjacent to said cathode of the first said cell and upon a separate part of the region of said conductor adjacent to said photoanode of the last said cell.

4. The photoelectrochemical device in accordance with claim 1, wherein said electrically interconnecting material is comprised of the conductive particles contained within a matrix.

5. The photoelectrochemical device in accordance with claim 4, wherein the matrix is a polymeric matrix.

6. The photoelectrochemical device in accordance with claim 1, wherein said electrically conductive particles further comprise particles of dimensions smaller than the distance between said opposing conductors.

7. The photoelectrochemical device in accordance with claim 6, wherein the smaller electrically conductive particles are of dimensions less than 5% of said distance between said opposing conductors.

8. The photoelectrochemical device in accordance with claim 2, wherein said electrically conductive particles are of a mixture of sizes, whereby some of said electrically conductive particles are of dimensions approximating the distance between said opposing conductors and other said electrically conductive particles are of dimensions smaller than said distance.

9. The photoelectrochemical device in accordance with claim 8, wherein the dimension of the other said electrically conductive particles are less than 5% of the distance between said opposing conductors.

10. The photoelectrochemical device in accordance with claim 5, wherein said polymeric matrix is wholly or partially comprised of one or more electrically conducting polymer materials.

11. The photoelectrochemical device in accordance with claim 1, wherein the conductive particles are made of Pt, W, Ti or carbon.

12. The photoelectrochemical device in accordance with claim 1, wherein the conductive particles are made of conductive oxides, ITO, or Ru-oxide.

13. The photoelectrochemical device in accordance with claim 1, wherein an additional layer of conductive polymer is placed between said conductive particles and the conductors.

14. The photoelectrochemical device in accordance with claim 1, wherein the photoanode consists of a layer of large band gap semiconductor (3), which is sensitized by an adsorbed layer of dye (4) that absorbs visible light.

15. The photoelectrochemical device in accordance with claim 1, wherein an electro catalytically active material (1) is deposited on the cathode (11).

16. The photoelectrochemical device in accordance with claim 1, wherein the electrolyte medium (5) contains redox mediator.

* * * * *